United States Patent
Xiao et al.

(10) Patent No.: US 8,849,348 B2
(45) Date of Patent: Sep. 30, 2014

(54) MOBILE DEVICE SESSION SWITCHING

(75) Inventors: Hong Xiao, Acton, MA (US); Elliot G. Eichen, Arlington, MA (US); Robert H. Liao, Chestnut Hill, MA (US); Paul O. Perry, Lexington, MA (US); Punita Mishra, Potomac, MD (US); Lee N. Goodman, Tyngsboro, MA (US); Sujin C. Chang, Stow, MA (US); Alok Mandloi, Gujarat (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 330 days.

(21) Appl. No.: 13/302,391

(22) Filed: Nov. 22, 2011

(65) Prior Publication Data

US 2013/0130669 A1    May 23, 2013

(51) Int. Cl.
| | |
|---|---|
| *H04M 17/00* | (2006.01) |
| *H04M 3/42* | (2006.01) |
| *H04M 3/00* | (2006.01) |
| *H04B 1/38* | (2006.01) |
| *H04M 1/725* | (2006.01) |
| *H04L 29/08* | (2006.01) |

(52) U.S. Cl.
CPC ...... *H04M 1/72572* (2013.01); *H04M 2250/66* (2013.01); *H04L 67/306* (2013.01); *H04M 1/72566* (2013.01)
USPC ........ 455/555; 455/414.1; 455/415; 455/416; 455/418; 455/552.1; 455/566; 455/567; 455/406

(58) Field of Classification Search
CPC ......... H04W 88/06; H04W 8/22; H04W 4/02; H04W 4/16; H04W 4/14; H04W 4/24
USPC ........... 455/406, 414.1, 415, 416, 418, 552.1, 455/566, 567
See application file for complete search history.

(56) References Cited

U.S. PATENT DOCUMENTS

| | | | |
|---|---|---|---|
| 6,700,972 B1 * | 3/2004 | McHugh et al. | 379/265.13 |
| 7,602,894 B1 * | 10/2009 | Shaffer et al. | 379/210.02 |
| 2002/0137517 A1 * | 9/2002 | Williams et al. | 455/444 |
| 2010/0246792 A1 * | 9/2010 | Acosta et al. | 379/202.01 |
| 2010/0330974 A1 * | 12/2010 | Balannik et al. | 455/418 |
| 2011/0201321 A1 * | 8/2011 | Bonner | 455/415 |
| 2012/0157165 A1 * | 6/2012 | Kim et al. | 455/566 |

* cited by examiner

*Primary Examiner* — Inder Mehra

(57) ABSTRACT

A method includes identifying, by a mobile device, a time, a day, a date or a location, and accessing a database storing first information correlating the time, day, date and location to a personal mode or a business mode for the mobile device. The method also includes identifying, exception information associated with the time, day, date, or location, and identifying user preference information associated with the personal mode and the business mode. The user preference information identifies a background associated with a home screen, icons provided on the home screen, or links to information accessible via the home screen. The method further includes configuring the mobile device in the personal or business mode based on the first information and the exception information, wherein the configuring includes providing, on the home screen, information corresponding to the user preference information associated with either the personal or business mode.

22 Claims, 8 Drawing Sheets

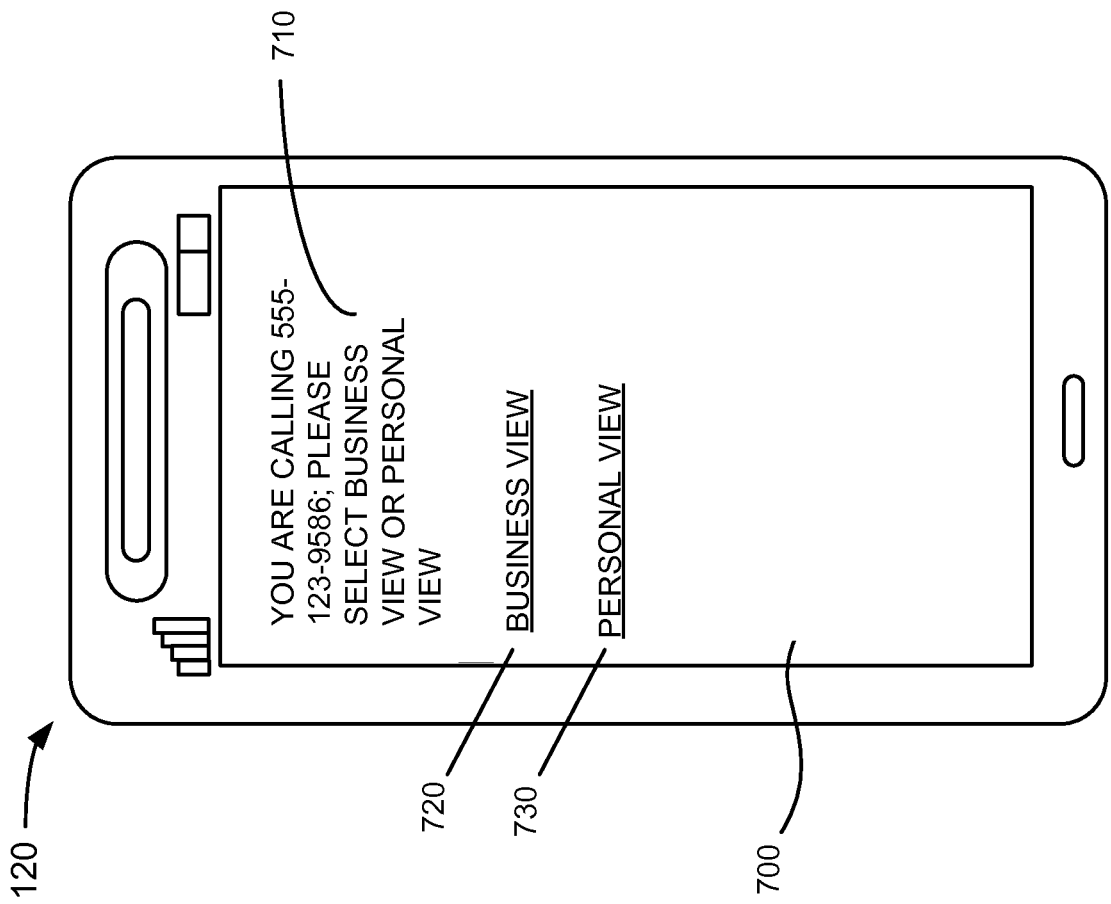

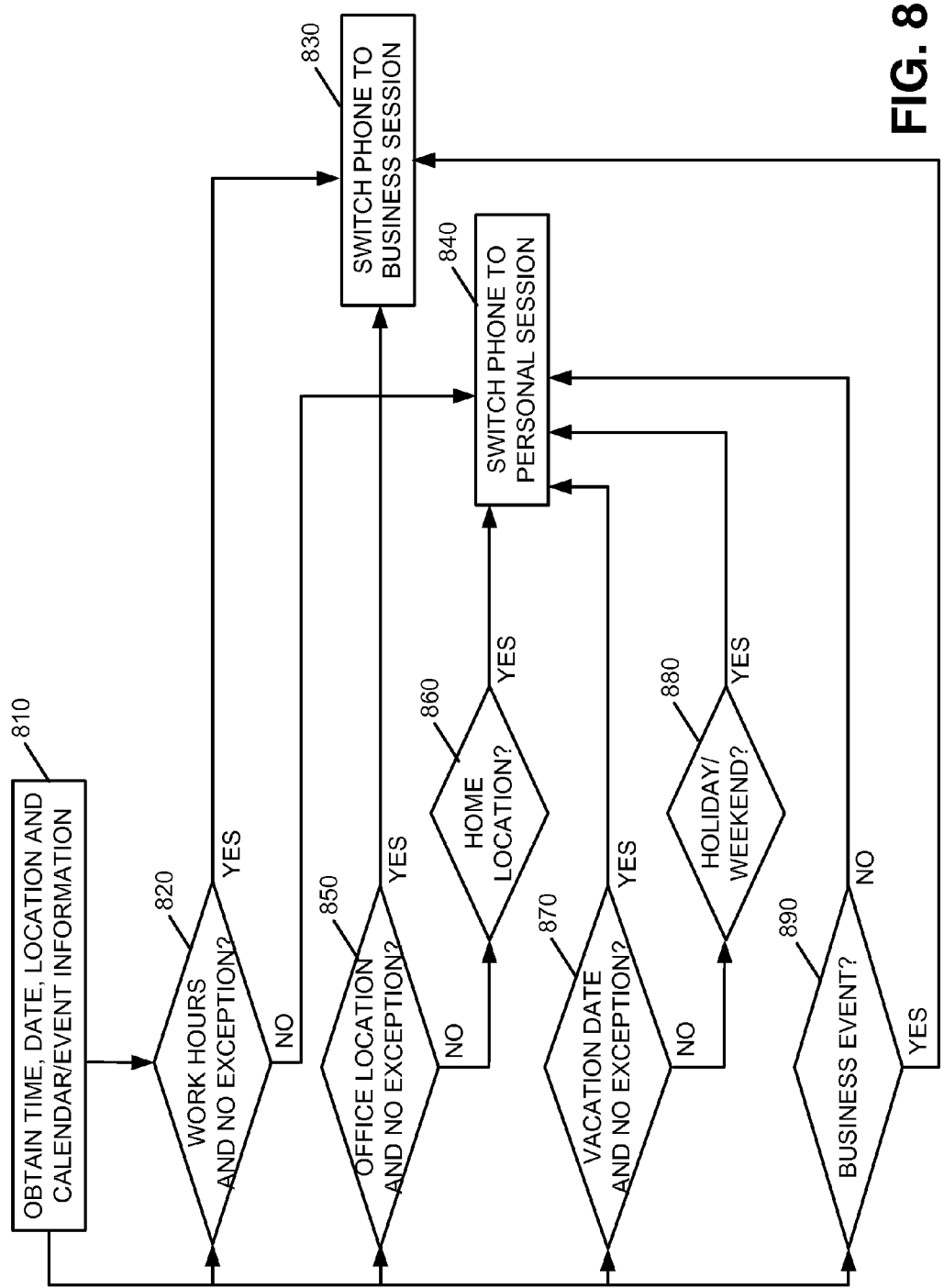

US 8,849,348 B2

MOBILE DEVICE SESSION SWITCHING

BACKGROUND INFORMATION

Companies frequently provide their employees with mobile telephones for conducting business-related communications. As a result, many people often carry two mobile phones while at work and/or at home—one for business use and one for personal use.

BRIEF DESCRIPTION OF THE DRAWINGS

FIG. 7 is a diagram of an exemplary mobile device used in connection with the processing described in FIG. 6; and FIG. 8 is a flow diagram illustrating exemplary processing associated with context-based switching of the mode associated with a mobile device.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to providing a single mobile device for both business use and personal use. For example, multiple account "views" may be created on the mobile device that allows the user to use the mobile device in a work mode, while also allowing the user to use the mobile device in a personal mode. In instances where the user wishes to use the device for personal use, the user may switch to a personal mode/view that provides the features associated with the personal use, such as the user's preferred home screen with icons or links to applications frequently used during personal use, access to the user's personal address book/contacts list, etc. Similarly, when the user wishes to use the mobile device in a business mode, the user may switch to a business mode/view that provides the features associated with the business use, such as the user's home screen with icons or links to applications frequently used for business-related purposes, access to the user's business address book/contacts list, access to business-related programs/systems, etc. In addition, the mobile device may include context-based switching functionality that automatically places the mobile device in the appropriate mode/view based on a number of context-based factors.

Figure 1:
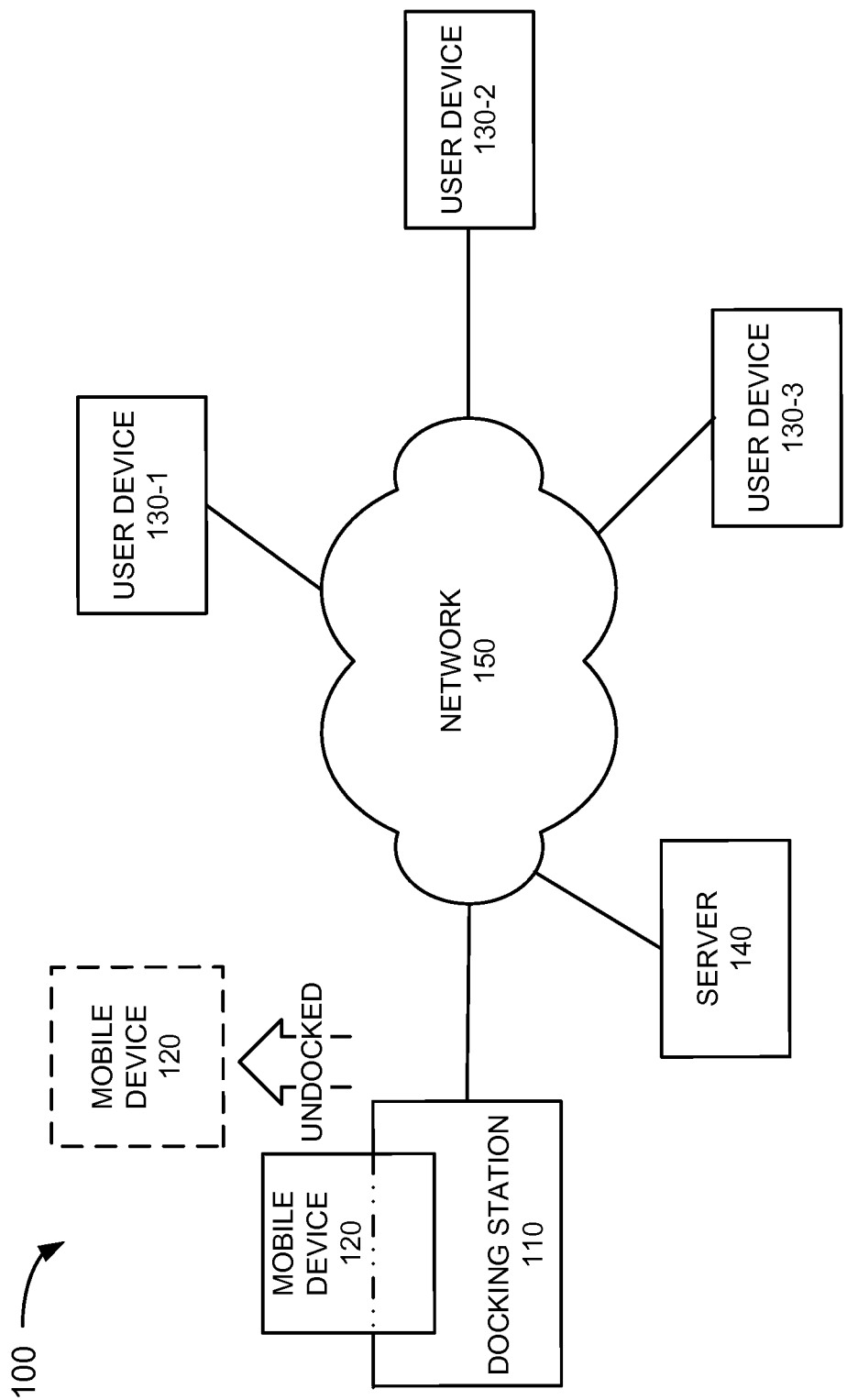
FIG. 1 illustrates an exemplary network in which systems and methods described herein may be implemented.

FIG. 1 is a block diagram of an exemplary network 100 in which systems and methods described herein may be implemented. Network 100 may include docking station 110, mobile device 120, user devices 130-1 through 130-3 (referred to individually as user device 130 or collectively as user devices 130), server 140 and network 150.

Docking station 110 may include a Voice over Internet Protocol (VoIP) device that has a connection to a VoIP network and which also has a docking port which permits a mobile device (e.g., mobile device 120) to be "docked" with docking station 110. While docked in docking station 110, docking station 110 may interact with mobile device 120 and also communicate with network 150 via a wired or wireless connection. For example, docking station 110 may connect to other devices in network 100 via a local area network (LAN), wide area network (WAN) or metropolitan area network (MAN) included in network 150.

Mobile device 120 may include, for example, a cellular telephone (e.g., a smart phone), a tablet computer, a personal digital assistant (PDA), a netbook or other type of digital computing device that has the capability to communicate via one or more networks. In an exemplary implementation, mobile device 120 may be "docked" with docking station 110, as illustrated in FIG. 1 by mobile device 120 being physically connected to docking station 110. Mobile device 120 may also be "undocked," as illustrated by the arrow labeled "undocked" in FIG. 1 and the dashed box representing mobile device 120 after mobile device 120 is undocked.

User devices 130 may represent telephone devices (e.g., public switched telephone network (PSTN) telephones, mobile phones), computing devices (e.g., personal computers (PCs), laptops, PDAs), and other devices that receive and/or send communications from/to mobile device 120.

Server 140 may include one or more computing devices, servers and/or backend systems that are able to connect to network 150 and transmit and/or receive information via network 150. In an exemplary implementation, server 140 is associated with an employer/enterprise that manages docking station 110 and/or mobile device 120. In such an implementation, server 140 may authenticate mobile device 120 via, for example, a user log-in procedure, to allow mobile device 120 to access information, programs, etc., associated with the enterprise.

Network 150 may include one or more wired, wireless and/or optical networks that are capable of receiving and transmitting data, voice and/or video signals, including multimedia signals that include voice, data and video information. For example, network 150 may include one or more PSTNs or other type of switched network. Network 150 may also include one or more wireless networks and may include a number of transmission towers for receiving wireless signals and forwarding the wireless signals toward the intended destinations. Network 150 may further include one or more satellite networks, one or more optical networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of receiving and transmitting data.

The exemplary configuration illustrated in FIG. 1 is provided for simplicity. It should be understood that a typical network may include more or fewer devices than illustrated in FIG. 1. For example, one mobile device 110, one docking station 120, three user devices 130, one server 140 and one network 150 are shown for simplicity. It should be understood that network 100 may include hundreds or thousands of docking stations 110, mobile devices 120, user devices 130, servers 140 and networks 150. Network 150 may also include additional elements, such as switches, gateways, routers, backend systems, etc., that aid in routing information, such as data to/from mobile devices 110, docking stations 120, user devices 130 and server 140. In addition, although docking station 110, mobile device 120, user devices 130 and server 140 are shown as separate devices in FIG. 1, in other implementations, the functions performed by two or more of these devices may be performed by a single device or platform.

Also, in some instances, one or more of the devices of network 100 may perform one or more functions described as being performed by another one or more of the devices of network 100.

Figure 2:
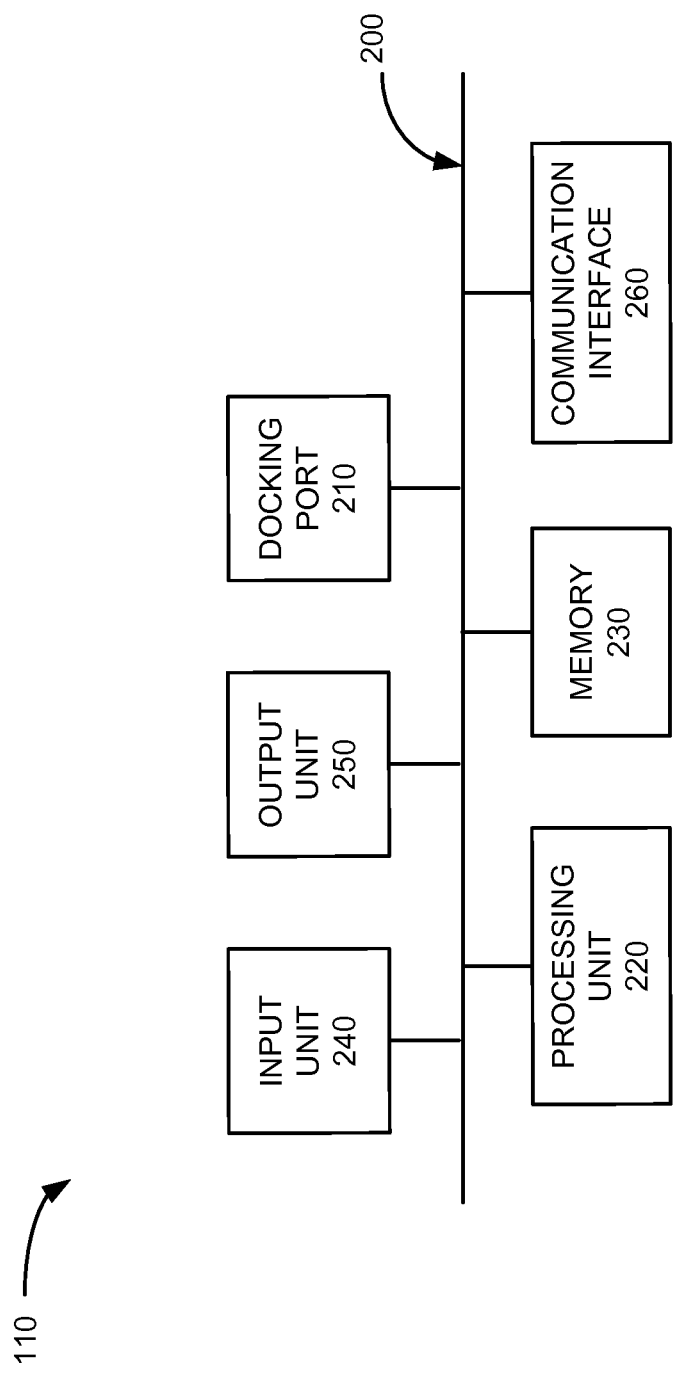
FIG. 2 illustrates an exemplary configuration of the docking station of FIG. 1.

FIG. 2 is a diagram illustrating exemplary components of docking station 110. Referring to FIG. 2, docking station 110 may include a bus 200, a docking port 210, a processing unit 220, a memory 230, an input unit 250, an output unit 260 and a communication interface 260.

Bus 200 may include a path that permits communication among the elements of docking station 110. Docking port 210 may include a port that physically engages with a tray or slot in docking station 110 into which mobile device 120 is inserted. The shape and size of the tray or slot in docking station 110, as well as the shape and size of docking port 210, may vary based on different external configurations of various mobile devices 120. Docking port 210 may further include a universal serial bus (USB) port or interface (not shown), which also include a charging port. That is, docking port 210 may include a USB port/interface that simultaneously acts as a data port and a battery charging port. The charging port may include an electrical connection for supplying a charging current to a battery of mobile device 120. In other implementations, docking station 110 may include multiple USB ports (not shown) and/or a USB hub. In each case, the USB port(s) may include an electrical connection for the USB that may interconnect docking station 110 with mobile device 120.

While docked in docking station 110, mobile device 120 be used to answer and place calls received/transmitted via docking station 110. For example, if mobile device 120 includes a touch panel display, the touch panel display may be used for placing a call, such as a VoIP call, that will be transmitted from docking station 110. Similarly, if mobile device 120 is a smart phone with a number of applications, such as a contacts list, call list, etc., the user may use the call list to initiate a call to a particular contact in the contacts list. The call, however, may be placed via docking station 110, which as described above, may initiate a VoIP call via network 150.

Processing unit 220 may include a processor, microprocessor, or processing logic that may interpret and execute instructions. Memory 230 may include a random access memory (RAM) or another type of dynamic storage device that may store information and instructions for execution by processing unit 220. Memory 230 may also include a read only memory (ROM) device or another type of static storage device that may store static information and instructions for use by processing unit 220. Memory 230 may further include a solid state drive (SDD). Memory 230 may also include a magnetic and/or optical recording medium (e.g., a hard disk) and its corresponding drive.

Input unit 240 may include a mechanism that permits a user to input information to docking station 110, such as a keyboard, a keypad, a mouse, a pen, a microphone, a touch screen, voice recognition and/or biometric mechanisms, etc. Input unit 240 may also include mechanisms for receiving input via radio frequency communications or near field communications. Output unit 250 may include a mechanism that outputs information to the user, including a display, a printer, a speaker, etc.

Communication interface 260 may include a transceiver for communicating with network 140. For example, communication interface 260 may also include one or more interfaces for communicating with mobile devices 110 when mobile device 120 is docked to docking station 110. In some implementations, communication interface 260 may include a near field communication (NFC) interface that allows docking station 110 to communicate with mobile device 120 when mobile device 120 is located in close proximity to docking station 110, but not docked with docking station 110.

The configuration of components of docking station 110 illustrated in FIG. 2 is for illustrative purposes only. In other implementations, docking station 110 may include additional, fewer and/or different components than those depicted in FIG. 2. For example, docking station 110 may include a magnetic sensor that may detect the insertion of mobile device 120 into docking port 210 and may thereby initiate various functions at docking station 110 or at mobile device 120 (e.g., initiate execution of a VoIP application or other application at mobile device 120, etc.).

Figure 3:
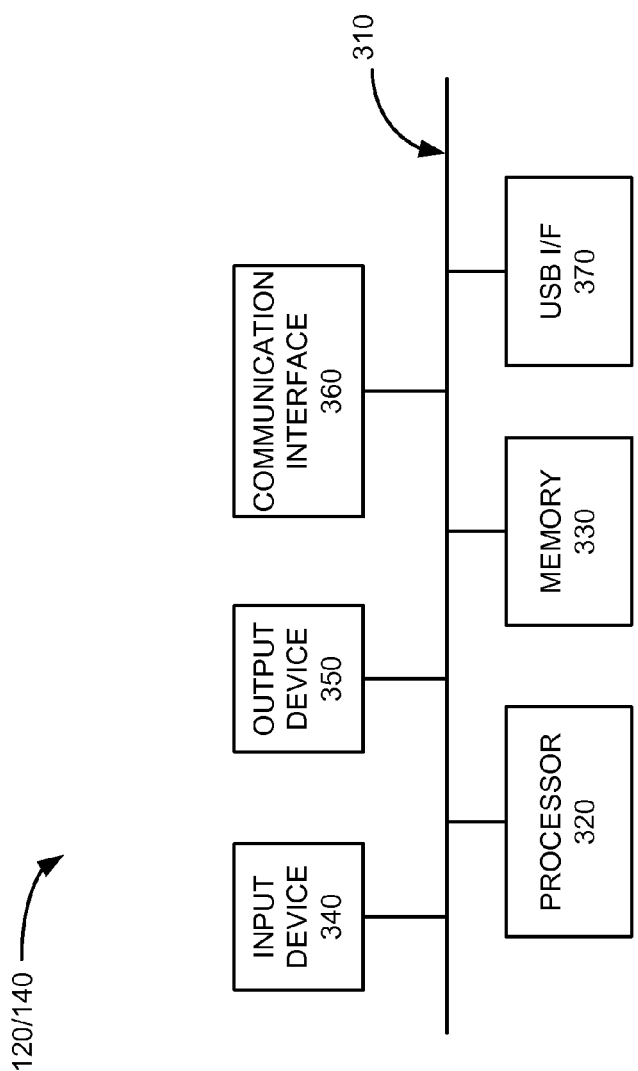
FIG. 3 illustrates an exemplary configuration of the mobile device of FIG. 1.

FIG. 3 is a diagram illustrating exemplary components of mobile device 120. Mobile device 120 may include a bus 310, a processor 320, a memory 330, an input device 340, an output device 350, a communication interface 360 and a USB interface 370.

Bus 310 may include a path that permits communication among the elements of mobile device 120. Processor 320 may include a processor, microprocessor, or processing logic that may interpret and execute instructions. Memory 330 may include a random access memory (RAM) or another type of dynamic storage device that may store information and instructions for execution by processor 320. Memory 330 may also include a ROM device or another type of static storage device that may store static information and instructions for use by processor 330. Memory 330 may further include a magnetic and/or optical recording medium.

Input device 340 may include one or more mechanisms that permit an operator to input information to mobile device 120, such as a keypad or a keyboard, an input button, a touchscreen display, voice recognition and/or biometric mechanisms, etc. In an exemplary implementation, input device 340 may include a physical button that the user presses to change the operating mode from a personal mode to a business mode or vice versa. In other implementations, input device 340 may include a touchscreen display in which the user presses/selects a software button, link, icon, etc., to change the operating mode of mobile device 120.

Output device 350 may include one or more mechanisms that output information to the operator, including a display (e.g., a liquid crystal display (LCD) that acts as a touchscreen display), a speaker, etc. Communication interface 360 may include any transceiver mechanism that enables mobile device 120 to communicate with other devices and/or systems. For example, communication interface 360 may include a radio frequency (RF) transceiver for communicating via a public land mobile network (PLMN), a global system for mobile communications (GSM), a satellite network, etc., that may be included in network 140. In some implementations, communication interface 360 may include a near field communication (NFC) interface/system that allows mobile device 120 to communicate with docking station 110 (or other devices) when mobile device 120 is located in close proximity to docking station 110 (or other devices), but not docked with docking station 110. For example, an NFC system in mobile device 120 may include a short range, high frequency system that enables the short range exchange of data with another device (e.g., docking station 110) that includes a similar NFC system.

USB I/F 370 may include interconnection mechanisms to permit mobile device 120 to physically and electrically connect with a mating USB port (e.g., docking port 210) of docking station 110.

The configuration of components of mobile device 120 illustrated in FIG. 3 is for illustrative purposes only. Other configurations may be implemented. Therefore, mobile device 120 may include additional, fewer and/or different components than those depicted in FIG. 3. For example, mobile device 120 may include a global positioning system (GPS) receiver/unit that may be used for determining a location of mobile device 120.

Server 140 may be configured in a similar manner as mobile device 120 illustrated in FIG. 3. For example, server 140 may include one or more processors 320, memories 330, input devices 340, output devices 350 and communications interfaces 360, as described above. However, in an exemplary implementation, server 140 may not include USB I/F 370.

Docking station 110, mobile device 120 and/or server 140 may perform operations in response to their respective processing units/processors (e.g., processing unit 220, processor 320) executing sequences of instructions contained in a computer-readable medium, such as memory 230 or memory 330. A computer-readable medium may be defined as a tangible memory device. The software instructions may be read into memory 230/330 from another computer-readable medium (e.g., a hard disk drive (HDD), SSD, etc.), or from another device via communication interface 260/360. Alternatively, hard-wired circuitry may be used in place of or in combination with software instructions to implement processes consistent with the implementations described herein. Thus, implementations described herein are not limited to any specific combination of hardware circuitry and software.

Figure 4:
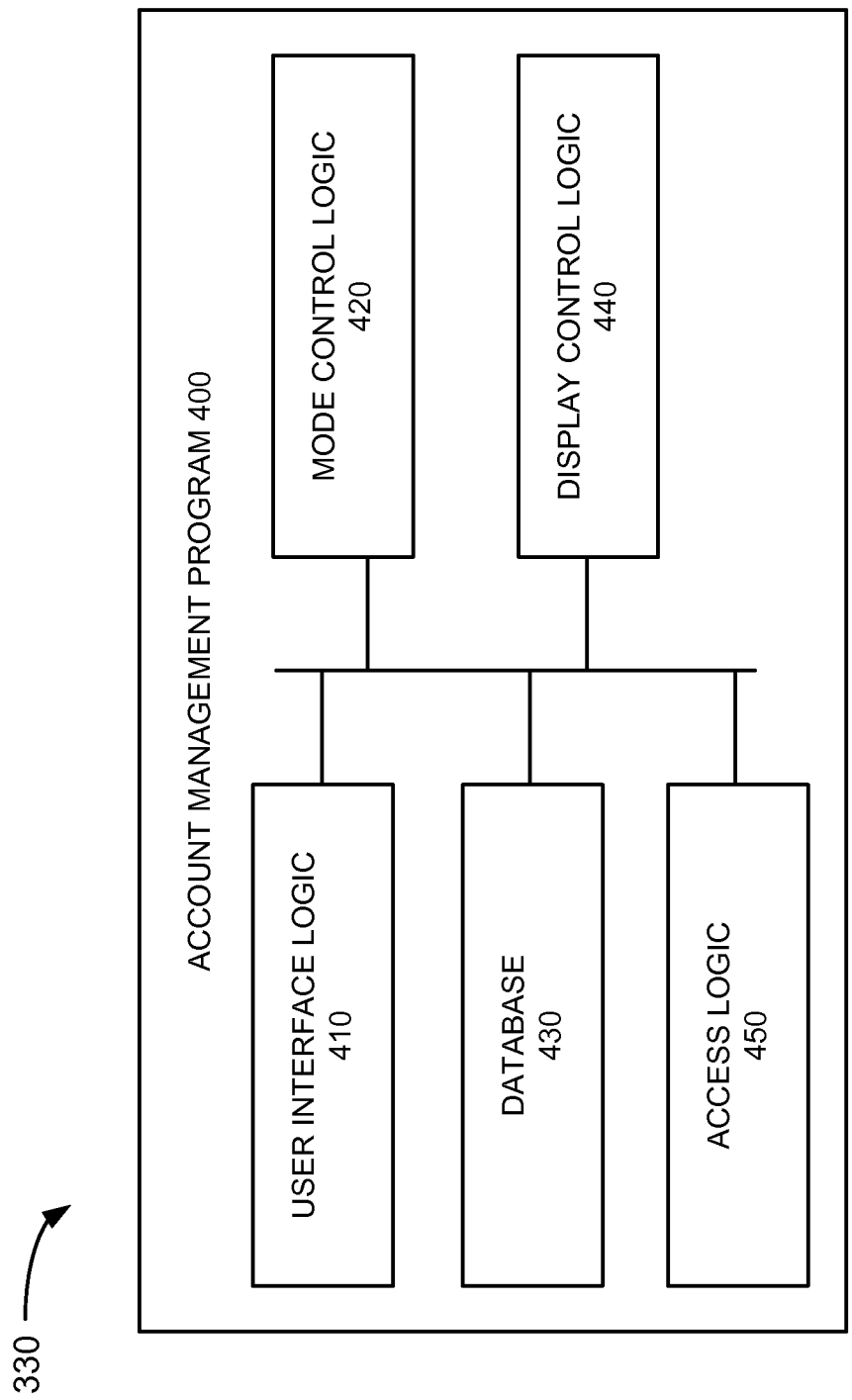
FIG. 4 illustrates exemplary logic components implemented in the mobile device of FIG. 3.

FIG. 4 is an exemplary functional block diagram of components implemented in mobile device 120 of FIG. 3. In an exemplary implementation, all or some of the components illustrated in FIG. 4 may be stored in memory 330. For example, referring to FIG. 4, memory 330 may include account management program 400. Account management program 400 may include software instructions executed by processor 320 that allows mobile device 120 to operate in multiple modes that provide the user with functionality associated with having multiple phones.

Account management program 400 may include user interface logic 410, mode control logic 420, database 430, display control logic 440 and access logic 450. Account management program 400 and its various logic components are shown in FIG. 4 as being included in memory 330 of mobile device 120. In alternative implementations, these components or a portion of these components may be located externally with respect to mobile device 120. For example, in some implementations, one or more of the components of account management program 400 may be located in or executed by another device external to mobile device 120, such as in server 140.

User interface logic 410 may include logic to allow a user to enter information associated with selecting a mode in which mobile device 120 operates. For example, user interface logic 410 may include an input button (e.g., a hardware button or a software button on mobile device 120) that allows the user to change the mode of operation of mobile device 120, such as change from a personal mode to a business mode or vice versa. User interface logic 410 may also include a graphical user interface (GUI) that displays a plurality of modes/accounts in which mobile device 120 may operate and allow the user to select a particular mode. The GUI may also allow the user to enter information identifying parameters defining settings associated with each mode, such as context-based settings that define conditions in which mobile device 120 is to operate in the personal mode and business mode. For example, the GUI may allow the user to identify hours of the day, days of the week, particular dates, location information, event-related information etc. during which mobile device is to operate in the personal mode and the business mode, as described in more detail below.

Mode control logic 420 may include logic to switch an operating mode of mobile device 120. As described above, a user may select an operating mode via user interface logic 410. In this case, mode control logic 420 may receive the selection and place mobile device 120 in the appropriate operating mode. Mode control logic 420 may also automatically switch the operating mode of mobile device 120 based on context information associated with mobile device 120 and/or the user of mobile device 120. The context information may be entered by the user via user interface logic 410, as described above.

Database 430 may include one or more databases that store context information associated with identifying an operating mode associated with mobile device 120. For example, database 430 may store information indicating that during the hours of 8:00 AM to 5:00 PM on Monday through Friday, mobile device 120 should operate in a business mode. Database 430 may store additional information indicating exceptions to this general rule. For example, database 430 may store information indicating that when the user is on vacation, as identified by an entry in a calendar application stored on mobile device 120, mobile device 120 should operate in personal mode regardless of the day of the week and/or time of day.

Database 430 may further store information indicating that when mobile device 120 is located in the user's work location, mobile device 120 is to operate in the business mode and when mobile device 120 is located at the user's home, mobile device 120 is to operating in the personal mode.

Database 430 may also store information associated with configuring mobile device 120 based on the different modes of operation. For example, database 430 may store information identifying one home screen background for a personal mode and another home screen background for a business mode. Database 430 may also store information identifying icons or links to applications associated with each of the modes/views in which mobile device 120 may operate. Database 430 may further store information identifying contacts lists/address books that will be accessible for each of the modes in which mobile device 120 may operate. As described above, the information stored in database 430 may be based on user-defined preferences provided by the user via user interface logic 410.

Display control logic 440 may include logic associated with providing the appropriate display to mobile device 120. For example, display control logic 440 may receive information from mode control logic 420 indicating the current mode of operation. Display control logic 440 may access database 430 to provide/configure the appropriate display, such as provide a user-defined home screen including icons representing various applications, links, pictures, a keypad etc., based on the mode in which mobile device 120 is operating.

Access logic 450 may control access to the appropriate programs, icons, etc., based on the mode of operation. As an example, access logic 450 may limit or control access to work-related programs when mobile device 120 is operating in a business mode. In an exemplary implementation, access logic 450 may set up a "firewall" to prevent access to work-related programs when mobile device 120 is operating in a personal mode and may require a user authentication (e.g., user password and ID) to allow access to a business-related program. This may prevent inadvertent and unauthorized access to company confidential information when mobile device 120 is being used for personal use.

Figure 5:
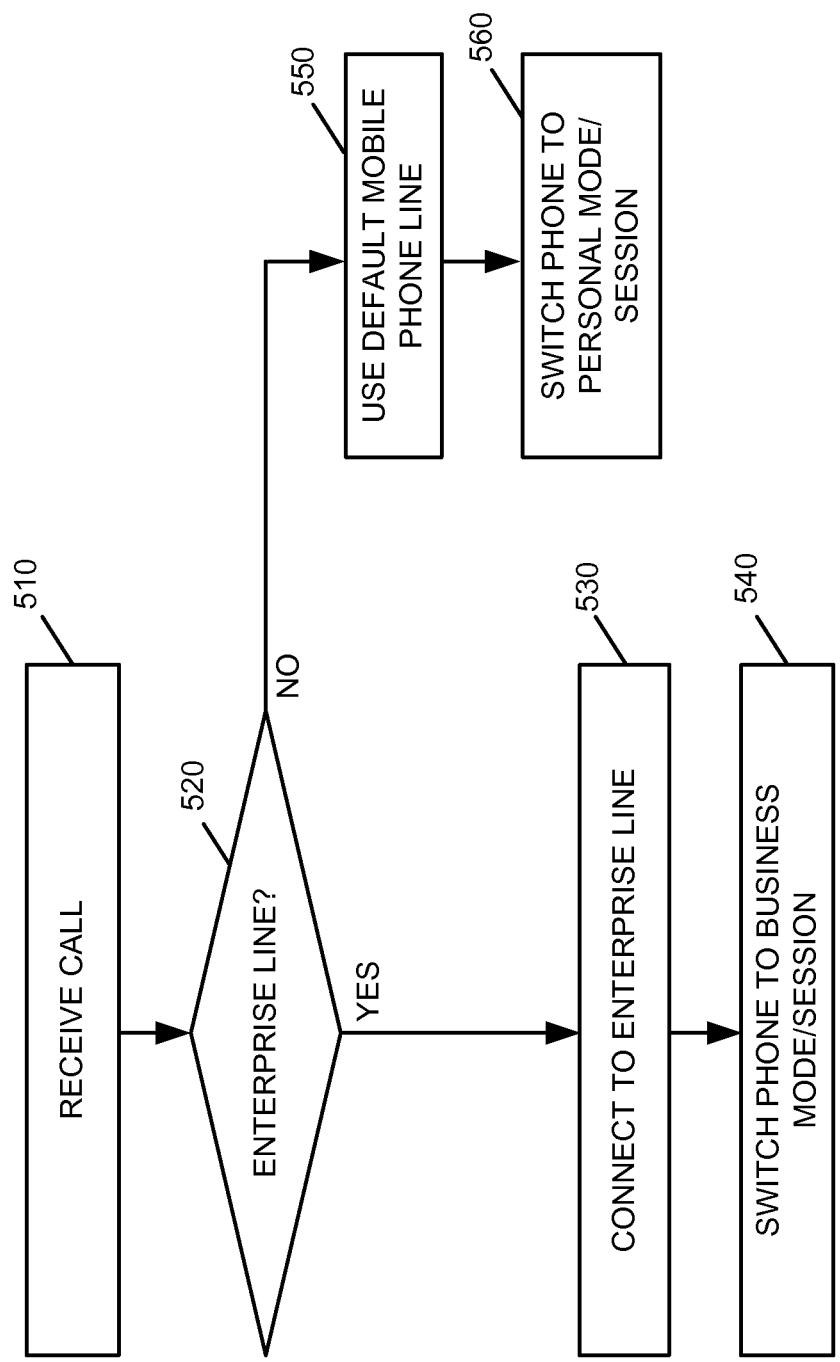
FIGS. 5 and 6 are flow diagrams illustrating exemplary processing associated with placing and receiving phone calls by the mobile device of FIG. 3.

FIG. 5 is a flow diagram illustrating exemplary processing associated with components of network 100. Processing may begin with mobile device 120 receiving a telephone call (block 510). Mobile device 120 may determine whether the call is received on an enterprise/business line (block 520). For example, when a user associated with mobile device 120 comes to work, he/she may place his/her mobile device 120 into docking station 110. Docking station 110 may be located in a cubicle or office where the user typically works. When mobile device 120 is docked in docking station 110, mobile device 120 may act as the interface for conducting phone conversations. Docking station 110 may also be associated with and/or connected to an enterprise or business telephone line and may be associated with an enterprise/business telephone number that callers can use to call the party associated with mobile device 120. An enterprise VoIP private branch exchange (PBX) server may send an inbound call to docking station 110 when mobile device 120 is docked in docking station 110. The VoIP PBX server may also detect when mobile device 120 is undocked and send an incoming call directed to the business line/business telephone number associated with docking station 110 directly to mobile device 120. In either case, mobile device 120 may be able to determine whether the call was received on the enterprise line via docking station 110 or was forward by the VoIP PBX server. For example, mobile device 120 may identify the called number to determine if the call was originally directed to the enterprise phone number/line.

In this scenario, if mobile device 120 determines that the call is received on the enterprise line (block 520—yes), mobile device 120 may connect to the enterprise line (block 530). For example, mobile device 120 may connect to the enterprise line via docking station 110 if mobile device 120 is docked, or may connect wirelessly via a mobile connection if mobile device 120 is not docked to docking station 110.

Mobile device 120 may also determine whether mobile device 120 is in a business mode/view simultaneously with connecting to the enterprise line. For example, if mobile device 120 is in personal mode when the call on the enterprise line is received, account management program 400 may configure mobile device 120 for the business mode/view (block 540). That is, mode control logic 420 may identify that the operating mode needs to be switched from the personal mode to the business mode and may signal display control logic 440 to change the operating mode/view. In this case, display control logic 440 may access database 430, identify the appropriate background, icons, etc., associated with the business mode, and configure mobile device 120 to provide the business mode/view. For example, display control logic 440 may provide a background or home screen associated with the display of mobile device 120 in accordance with the user's preferred business mode home screen. Display control logic 440 may also provide the appropriate icons, links, etc., associated with the home screen while mobile device 120 is in the business mode. Access logic 450 may also provide access to the appropriate information, programs, etc., associated with the business mode.

If mobile device 120 is already in the business mode when the enterprise call is received, mobile device 120 may answer the call. That is, processing associated with block 540 may be bypassed.

If, however, the call is not received on the enterprise line (block 520—no), mobile device 120 may connect to the caller via the mobile connection (e.g., RF antenna/interface) associated with mobile device 120 (block 550). For example, if the call is directed to the telephone number assigned to mobile device 120, as opposed to a call directed to a business telephone number associated with docking station 110 or a business number for which calls are forwarded to mobile device 120, mobile device 120 may connect to the caller using the default mobile connection associated with mobile device 120.

In each case, mobile device 120 may also determine whether mobile device 120 is in a personal mode when connecting to the caller. For example, if mobile device 120 is in the business mode when the call is received, account management program 400 may re-configure mobile device 120 for the personal mode (block 560). That is, mode control logic 420 may signal display control logic 440 to change the mode to the personal mode. Display control logic 440 may access database 430, identify the appropriate home screen, background, icons, etc., associated with the personal mode, and configure mobile device 120 to provide the personal mode/view on mobile device 120.

For example, display control logic 440 may provide a home screen background associated with the display of mobile device 120 in accordance with the user's pre-defined personal home screen preferences. Display control logic 440 may also provide the appropriate icons, links, pictures, etc., on the user's home screen that are associated with the user's personal mode. In some implementations, access logic 450 may also ensure that access to business-related information, programs, etc., within mobile device 120 is blocked while mobile device 120 is in the personal mode.

If mobile device 120 is already in the personal mode when the call associated with the user's mobile line/connection is received, mobile device 120 may continue and answer the call. That is, processing associated with block 560 may be bypassed.

In this manner, an incoming call may trigger account management program 400 to configure mobile device 120 in the appropriate operating mode. That is, account management program 400 may identify the call as being received on a business line/number or a personal line/number and configure mobile device 120 in the appropriate mode. As a result, the user may be able to easily interact with the caller and/or easily retrieve personal information that may be relevant to the call.

As described above, mobile device 120 may interact with docking station 110 to facilitate communications with callers, as well as use the mobile connection associated with mobile device 120 to answer other calls. In each case, when the call is answered, mobile device 120 may be in the appropriate mode to facilitate communications with the caller. Mobile device 120 may also facilitate outgoing communications with callers by ensuring that mobile device 120 is in the proper mode based on a number of factors associated with a call, as described in detail below.

Figure 6:
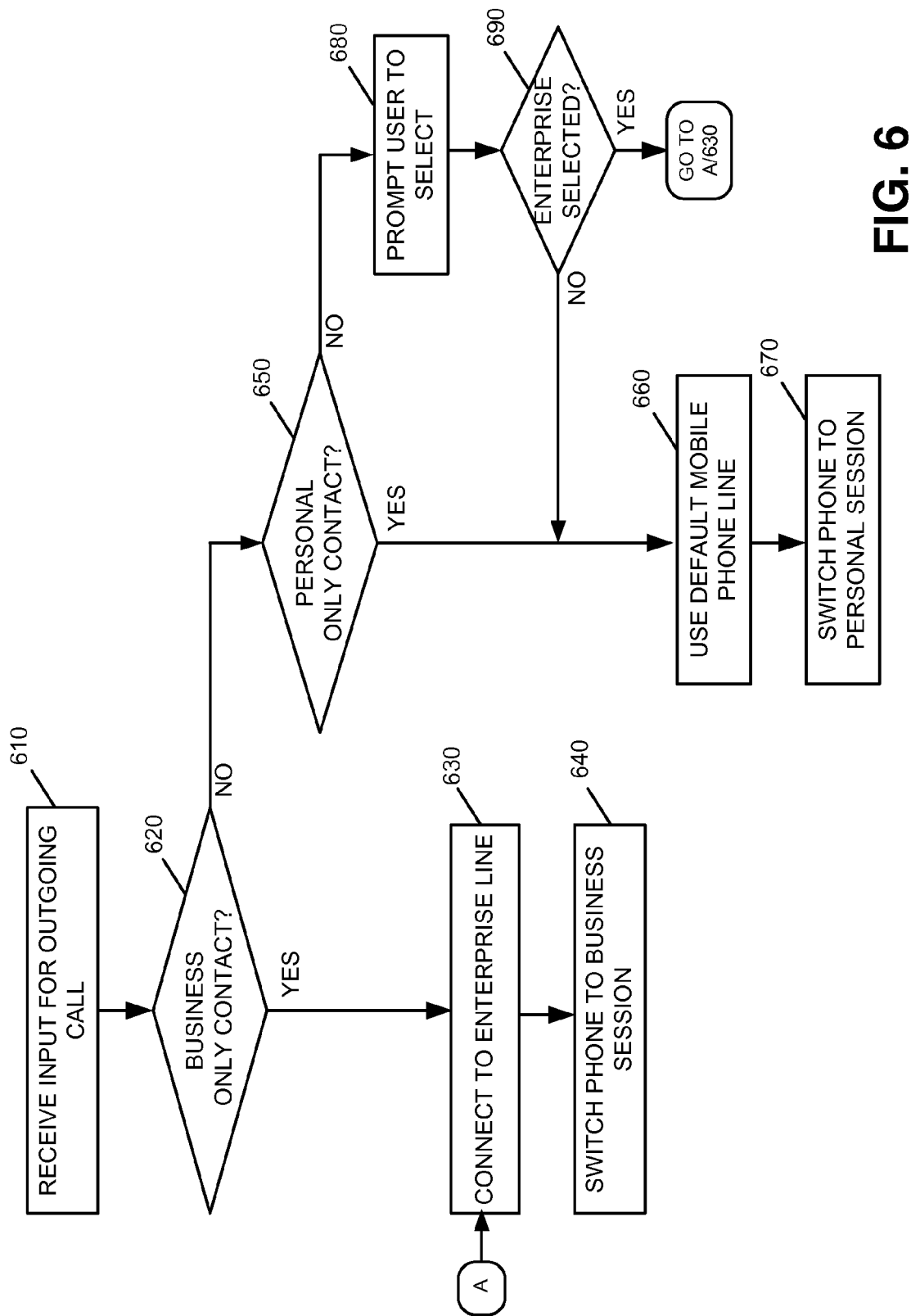

FIG. 6 is a flow diagram illustrating exemplary processing associated with processing an outgoing call. Processing may begin with mobile device 120 receiving input from a user associated with placing an outgoing telephone call (block 610). For example, the user may enter information via a keypad of mobile device 120 to place a telephone call, select a contact in a contacts list, provide voice information identifying a contact or telephone number, etc. Mobile device 120 may compare the entered/selected telephone number to telephone numbers stored in a contact lists in mobile device 120. In an exemplary implementation, mobile device 120 may store a contacts list that identifies each telephone number/party as a business contact and/or a personal contact. Mobile device 120 may then determine whether the entered/selected telephone number is associated with a party identified as only a business contact (block 620).

For example, mode control logic 420 may determine whether the input/selected telephone number is associated with a party that is only listed as a business contact and not a personal contact. In other implementations, mobile device 120 may store separate contacts list for business contacts and personal contacts and determine whether the telephone number is only listed in the business contacts list. In either case, if the telephone number is associated with a party identified as only a business contact (block 620—yes), mobile device 120 may connect to the enterprise line via, for example, docking station 110 (block 630). In other instances, mobile device 120 may connect to the enterprise line wirelessly.

Mobile device 120 may also determine whether mobile device 120 is in a business mode/view simultaneously with connecting to the enterprise line. For example, if mobile device 120 is in personal mode when the call is ready to be placed on the enterprise line, account management program 400 may configure mobile device 120 for the business mode/view (block 640). That is, display control logic 440 may access database 430, identify the appropriate home screen background, icons, etc., associated with the business mode, and configure mobile device 120 to provide the business mode/view on mobile device 120. Access logic 450 may also provide access to the appropriate business-related information, programs, etc., within mobile device 120. If mobile device 120 is already in the business mode/view when the enterprise call is ready to be placed, mobile device 120 may continue and place the call. That is, processing associated with block 640 may be bypassed.

If, however, the call is not being placed to a business only contact (block 620—no), mode control logic 420 may determine whether the entered/selected telephone number is associated with a party that is only listed as a personal contact in the user's contact list(s) (block 650). If the telephone number is listed as being associated with a party identified as only a personal contact (block 650—yes), mobile device 120 may use the mobile phone connection/RF interface associated with mobile device 120 to place the outgoing call (block 660). Mobile device 120 may also determine whether mobile device 120 is in a personal mode simultaneously with placing the telephone call via the mobile phone line. For example, if mobile device 120 is in the business mode when the telephone number is provided, account management program 400 may re-configure mobile device 120 for the personal mode/view (block 670). That is, display control logic 440 may access database 430, identify the appropriate home screen background, icons, etc., associated with the personal mode, and configure mobile device 120 to provide the personal mode/view on mobile device 120. Access logic 450 may also ensure that access to business-related information, programs, etc., within mobile device 120 is blocked. If mobile device 120 is already in the personal mode when the personal call is ready to be placed, mobile device 120 may continue and place the call. That is, processing associated with block 670 may be bypassed.

If, however, the call is not being placed to a telephone number corresponding to a party listed only as a business contact or a party listed only as a personal contact (block 620—no and block 650—no), user interface logic 410 may prompt the user to select the mode of operation (block 680). For example, user interface logic 410 may provide a prompt via output device 350 (e.g., touchscreen LCD), inquiring whether the user would like to place mobile device 120 in the business mode or personal mode, as illustrated in FIG. 7.

Referring to FIG. 7, mobile device 120 is illustrated as a smart phone with a touch screen display 700. In this implementation, user interface logic 410 may provide a message at area 710, such as "You are calling 555-123-9586; please select business view or personal view." User interface logic 410 may also provide a link/selection for business view at area 720 and a link/selection for personal view at area 730.

If the user selects the business/enterprise view link 720 (block 690—yes), processing may continue to block 630. That is, mobile device 120 may connect to the enterprise line via, for example, docking station 110 or via an RF connection (block 630). Mobile device 120 may also determine whether mobile device 120 is in a business mode simultaneously with connecting to the enterprise line. For example, if mobile device 120 is in personal mode when the call is ready to be placed on the enterprise line, account management program 400 may configure mobile device 120 for the business mode/view (block 640).

If, however, the business mode is not selected (e.g., the user selects personal view link 730) (block 690—no), processing may continue to block 660. That is, mobile device 120 may use the mobile phone line/interface to place the outgoing call (block 660). Mobile device 120 may also determine whether mobile device 120 is in a personal mode simultaneously with placing the telephone call via the mobile connection. For example, if mobile device 120 is in the business mode when the telephone number is provided, account management program 400 may re-configure mobile device 120 for the personal mode (block 670).

In this manner, an outgoing call may trigger account management program 400 to configure mobile device 120 in the appropriate operating mode. As a result, the user may be able to easily interact with the caller during a personal or business-related communication session and/or easily retrieve personal or business information that may be relevant to the call.

As described above, mobile device 120 may operate in a business mode and a personal mode when placing and receiving phone calls. Mobile device 120 may operate in a similar manner when receiving or sending other types of communications, such as text-based communications (e.g., emails, short message service (SMS) based messages or other text-based messages/communications). In addition, in implementations described herein, mobile device 120 may also automatically switch between personal and business modes based on the particular context or environment in which mobile device 120 is operating, and/or the context environment associated with the user of mobile device 120, as described in detail below.

FIG. 8 illustrates exemplary processing associated with context-based switching between a business mode and a personal mode, or vice versa. Assume that mobile device 120 includes a calendar application that stores events entered by the user. For example, the events may be associated with personal event and business events. As an example, one event may be associated with a business teleconference scheduled for a particular time, whereas another event may be associated with a reminder to call a friend to wish him/her a happy birthday. In one implementation, the user may enter information in the calendar application identifying whether the event is associated with business or whether the event is personal. In other implementations, mobile device 120 may include a business calendar and a personal calendar application and the user may access the appropriate calendar application/interface when entering information. Further assume that mobile device 120 includes a GPS receiver that receives GPS information and identifies the location of mobile device 120.

Processing may begin with account management program 400 obtaining time, date, location information and event information (block 810). For example, mode control logic 420 may obtain the time and date information from a clock/calendar within mobile device 120. Mode control logic 420 may also obtain location information via the GPS receiver located in mobile device 120, or via another location identifying mechanism. Mode control logic 420 may further access a calendar application(s) stored on mobile device 120 to identify particular events associated with the user of mobile device 120. Mode control logic 400 may receive or request the date, time, day, location and event information from the appropriate devices in mobile device 120 at periodic intervals or on a continuous basis.

Mode control logic 420 may determine whether the current time corresponds to working hours associated with the user of mobile device 120 and that no exception exists with respect to the current day (block 820). For example, mode control logic 420 may compare the current time to information stored in database 430 that identifies the user's normal work hours. As discussed above with respect to FIG. 4, the user of mobile device 120 may have previously entered his/her normal work hours via user interface logic 410. The user may have also entered information identifying any exceptions with respect to the user's work hours. For example, the user may have entered information indicating that he/she is out of the office/not working after 3:00 PM on Wednesdays.

If the current time (e.g., 10:00 AM) is within the user's normal work hours (e.g., 8:00 AM to 5:00 PM) and no relevant exception exists with respect to the current day (block 820—yes), mode control logic 420 may place mobile device 120 in the business mode and may signal display control logic 440 to provide the appropriate display information on the home screen of mobile device 120 (block 830). If mobile device 120 is already in the business mode, block 830 may be skipped.

If, however, the current time is not within the user's predefined work hours, or an exception exists with respect to the current day and time (e.g., it is Wednesday at 4:00 PM and the exception described above is stored in database 430), mode control logic 420 may place mobile device 120 in the personal mode and may signal display control logic 440 to provide the appropriate display information on the home screen mobile device 120 (block 840). If mobile device 120 is already in the personal mode, block 840 may be skipped.

Mode control logic 420 may also determine if the location of mobile device 120 matches the user's work location and that no exceptions exist (block 850). For example, if the GPS receiver in mobile device 120 indicates that the current location of mobile device 120 is 124 Main Street in Arlington, Va., database 430 indicates that this location corresponds to the user's office, and no relevant exception exists with respect to the current day/location (block 850-yes), mode control logic 420 may place mobile device 120 in the business mode (block 830). In the business mode, display control logic 440 may provide the appropriate display information on the home screen of mobile device 120 (block 830). If mobile device 120 is already in the business mode, block 830 may be skipped.

If, however, the current location is not associated with the user's predefined work location(s), or an exception exists with respect to the current day and time, mode control logic 420 may determine whether the current location corresponds to the user's home location (block 860). If the current location does correspond to the user's home location (block 860—yes), mode control logic 420 may place mobile device 120 in the personal mode and signal display control logic 440 to provide the appropriate display information on the home screen of mobile device 120 (block 840). If mobile device 120 is already in the personal mode, block 840 may be skipped. If, however, the location of mobile device 120 does not correspond to either the user's home or office, mode control logic 420 may maintain mobile device 120 in its current mode or switch to a default mode of operation.

Mode control logic 420 may also determine if the current date corresponds to a vacation date stored in, for example, the calendar application on mobile device 120 and that no exceptions exist (block 870). For example, if the calendar application indicates that Jul. 3, 2011 is a vacation date and the current day is Jul. 3, 2011 and no relevant exception exists with respect to the current day (block 870—yes), mode control logic 420 may place mobile device in the personal mode and signal display control logic 440 to provide the appropriate home screen display (block 840). If mobile device 120 is already in the personal mode, block 840 may be skipped.

If, however, the current date is not associated with a vacation date, or an exception exists with respect to the current date, mode control logic 420 may determine whether the current day is a holiday or weekend (block 880). If the current date is a holiday or weekend (block 880—yes), mode control logic 420 may place mobile device 120 in the personal mode (block 840). If mobile device 120 is already in the personal mode, block 840 may be skipped. If the date does not correspond to a holiday or weekend, mode control logic 420 may maintain mobile device 120 in its current mode or switch to a default mode.

Mode control logic 420 may also determine if an event, such as an event that provides an alert on touch screen 700 (FIG. 7) of mobile device 120, has occurred and whether the event corresponds to a business event (block 890). For example, if the event corresponds to a business teleconference that is going to start in five minutes (block 890—yes), mode control logic 420 may place mobile device 120 in the business mode (block 830). If mobile device 120 is already in the business mode, block 830 may be skipped.

If, however, the event corresponds to a personal event (such as "call Sue to wish her happy birthday") (block 890—no), mode control logic 420 may place mobile device 120 in the personal mode (block 840). If mobile device 120 is already in the personal mode, block 840 may be skipped.

In the implementation described above with respect to FIG. 8, mode control logic 420 is described as making determinations regarding the time of day, the location, the date, the type of event in a serial manner. In an exemplary implementation, mode control logic 420 may make the determinations described above with respect to blocks 810, 820 and 850-890 essentially simultaneously or as a group and place mobile device 120 in the appropriate mode based on the determinations.

In the implementations described above, mobile device 120 is able to be used in two modes—a personal mode and a business mode, with account management program 400 including intelligence to automatically and dynamically place mobile device 120 in the appropriate mode based on a number of factors, including the context or environment in which mobile device 120 is being used. Described below are a number of use cases in which account management program 400 operates to provide users with a multi-functional mobile device 120 that can operate in two (or more) virtual modes that essentially provide the functionality of two (or more) separate phones.

As a first use case, assume that Joe is a mechanical engineer who configures mobile device 120 via account management program 400 such that when he arrives at the office, mobile device 120 automatically switches to the business mode/view. In this mode, Joe can still receive calls from his wife and mobile device 120 may automatically switch to the personal mode/view in response to receiving a call from his wife. Joe may also configure mobile device 120 such that when he returns home, mobile device 120 automatically switch to the personal mode. Joe may further configure mobile device 120 to automatically switch to the personal mode/view on weekends, holidays and when he is on vacation.

As another example, assume that Shelly is a saleswoman who travels frequently. Further assume that while Shelly is on her way to a hotel, she checks a text message from her daughter while mobile device 120 is in the personal mode. Further assume that while she is reading the text message, Shelly receives a call from her business customer Larry through the enterprise phone line. Mobile device 120 may identify that the call was received via the enterprise line and forwarded to mobile device 120 and automatically switch mobile device 120 to the business mode. In the business mode, Shelly can click/select the accept button and talk to Larry. In the business mode, Shelly may also be able to access her business calendar to confirm a meeting with Larry. In the business mode, Shelly may further access and forward a sales presentation to Larry from her business files/documents and business emails that are accessible in the business mode. Shelly may further save information associated with the call from Larry in a business-related call log.

In still another use case, assume that Jack is a sales engineer who is currently at a trade show. Further assume that Jack switches mobile device 120 to the personal mode by pressing a button on mobile device 120, opens his contacts list, calls his wife and begins a conversation about his daughter's upcoming birthday party. Assume that after the conversation with his wife, Jack selects a contact identifier in the contacts list for his co-worker John to talk about a redesign of a new system. In this scenario, further assume that John is listed in both of Jack's personal and business contacts list. In this case, user interface logic 410 may automatically pop a message to the display of mobile device 120 similar to that illustrated in FIG. 7. The popup message may allow Jack to choose whether to use the enterprise line or the default mobile phone line to place the call. Since this call is about a work matter, assume that Jack selects the enterprise line to place the call. Mode control logic 420 may automatically switch mobile device 120 to the business mode.

In another use case, assume that Mary is at a meeting with her business client and places mobile device 120 on mute. Further assume that mobile device 120 receives a call from her son who left a voicemail message. After the meeting, Mary turn on mobile device 120 and notices a voicemail alert and mobile device 120 inquires whether she would like to listen to the voicemail message or ignore the voicemail message. Assume that Mary selects to listen to the voicemail message. In this case, mode control logic 420 may identify that the voicemail message was from a party identified in Mary's personal contacts list and automatically switch mobile device 120 to the personal mode. Mary can then easily call her son back using the personal call log/personal contacts list. Further assume that during the call to her son, Mary receives an SMS alert/message from her colleague Rich and Mary elects to view/accept the SMS. Mode control logic 420 determines that the SMS is from a business contact and automatically switches mobile device 120 to the business mode.

Implementations described herein allow a single mobile device to be used in multiple modes that provide the user with functionality associated with multiple phones. In addition, the mobile device may include intelligence to automatically and dynamically switch the mobile device into the appropriate mode based on user-defined parameters. This may eliminate the need for parties to carry multiple mobile devices.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in implementations described above, mobile device 120 is used by a party in connection with a business/enterprise, as well as for personal use. In some implementations, actions or functions performed during the business/enterprise use may be managed by the enterprise. For example, mobile device 120 may interact with server 140 (FIG. 1) such that security features, data backup/protection, monitoring, etc., associated with accessing business-related information may be provided in accordance with the enterprise's particular requirements (e.g., security requirements).

In addition, features have been described above with respect to mobile device 120 receiving communications forwarded from a business/enterprise line or directly via a mobile phone line associated with mobile device 120. In other implementations, mobile device 120 may register with an entity that allows mobile device 120 to register a number of virtual phone numbers to receive calls associated with the multiple different telephone numbers. In this scenario, mobile device 120 may identify the telephone number to which the call was originally placed and place mobile device 120 in the appropriate mode in a similar manner to that described above.

Still further, mobile device 120 has been described as being used in two modes—a personal mode and a business mode. In other implementations, mobile device 120 may be used in more than two modes. For example, the user may configure mobile device 120 to operate in multiple personal modes, such as a first mode associated with family members, a second mode associated with friends, etc., and also operate in multiple business modes, such as a first business mode for work-related matters, a second business mode associated with a side business that the user is operating, etc. In this manner, a user may configure mobile device 120 to operate as a number of "virtual phones" that provide the user with functionality associated with multiple phones.

In addition, mobile device 120 has been described as including intelligence to switch the operating mode based on context or the conditions/environment in which mobile device 120 is operating. It should be understood that these parameters were exemplary only and that mobile device 120 may be configured to switch the operating mode based on other types of context-based information, environment-based information or operational parameters in other implementations.

Further, while series of acts have been described with respect to FIGS. 5, 6 and 8, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   identifying, by a mobile device, at least one of a time of day, a day of the week, a date or a location of the mobile device;
   accessing, by the mobile device, a database storing first information correlating the time of day, the day of the week, the date and the location to a personal mode for the mobile device or a business mode for the mobile device;
   identifying, in the database, exception information associated with at least one of the time of day, the day of the week, the date, or the location of the mobile device;
   identifying, by the mobile device, user preference information associated with the personal mode of the mobile device and the business mode of the mobile device, wherein the user preference information identifies, for both the personal mode and the business mode, at least one of a background associated with a home screen of the mobile device, icons provided on the home screen of the mobile device, or links to information accessible via the home screen of the mobile device;
   configuring the mobile device in the personal mode or the business mode based on the first information and the exception information, wherein the configuring includes:
      providing, on the home screen of the mobile device, information corresponding to the user preference information associated with either the personal mode or the business mode:,
   receiving an incoming telephone call at the mobile device;
   determining whether the incoming telephone call is associated with a personal use of the mobile device or a business use of the mobile device; and
   automatically configuring the mobile device in the personal mode or the business mode based on the determining.

2. The method of claim 1, wherein the determining whether the incoming telephone call is associated with a personal use of the mobile device or a business use of the mobile device comprises:
   determining whether the telephone call was directed to a business line or a business telephone number, and
   identifying the telephone call as being associated with the business use in response to determining that the telephone call was directed to the business line or the business telephone number.

3. The method of claim 2, wherein the identifying the telephone call as being associated with the business use comprises:
   determining that the telephone call was received via a docking station to which the mobile device is coupled.

4. The method of claim 1, wherein the determining whether the incoming telephone call is associated with a personal use of the mobile device or a business use of the mobile device comprises:
   accessing at least one contacts list stored in the mobile device,
   determining whether a telephone number of the incoming telephone call is associated with a contact identified in the at least one contacts list as a business contact or a personal contact, and
   identifying the incoming telephone call as being associated with the business use in response to determining that the telephone number is associated with a contact identified as only a business contact.

5. The method of claim 1, wherein the configuring the mobile device in the personal mode further comprises:
   blocking access to business related information or programs stored in the mobile device.

6. The method of claim 1, further comprising:
   receiving information associated with an event stored in a calendar application of the mobile device;
   configuring the mobile device in the personal mode in response to identifying that the event corresponds to a personal event; and
   configuring the mobile device in the business mode in response to identifying that the event corresponds to a business event.

7. The method of claim 1, further comprising:
   receiving, by the mobile device, a voicemail message or a text-based message;
   accessing, by the mobile device, the voicemail message or the text-based message;
   determining, by the mobile device, whether the voicemail message or the text-based message was received from a party identified as a business contact or a personal contact;
   automatically configuring the mobile device in the personal mode in response to determining that the party is identified as a personal contact; and
   automatically configuring the mobile device in the business mode in response to determining that the party is identified as a business contact.

8. The method of claim 1, further comprising:
   placing a telephone call from the mobile device;
   identifying whether the telephone call is associated with a personal use of the mobile device or a business use of the mobile device; and
   automatically configuring the mobile device in the personal mode or the business mode based on the identifying.

9. The method of claim 8, wherein the identifying whether the telephone call is associated with a personal use of the mobile device or a business use of the mobile device comprises:
   accessing at least one contacts list stored in the mobile device;
   determining whether a telephone number associated with the telephone call is associated with a party identified in the at least one contacts list as a business contact or a personal contact; and
   determining that the telephone call is associated with the business use in response to determining that the telephone number is associated with a contact identified as a business contact only.

10. The method of claim 1, wherein the user preference information identifies, for both the personal mode and the business mode, the background associated with the home screen of the mobile device, icons provided on the home screen of the mobile device, and links to information accessible via the home screen of the mobile device.

11. A mobile device, comprising:
a memory configured to store user preference information corresponding to a personal mode of the mobile device and a business mode of the mobile device, wherein the use preference information includes at least one of a background associated with a home screen of the mobile device, icons provided on the home screen, or links to information accessible via the home screen;
a communication interface configured to place and receive communications; and
logic configured to:
identify first information including at least one of a time of day, a day of the week, a date or a location of the mobile device,
identify exception information associated with the at least one of the time of day, the day of the week, the date or the location of the mobile device,
configure the mobile device in the personal mode or the business mode based on the first information and the exception information, wherein when configuring the mobile device, the logic is configured to:
access the memory to identify user preference information,
identify programs associated with the personal mode or the business mode,
provide, on the home screen of the mobile device, information associated with at least some of the identified user preference information, and
provide access to the identified programs,
receive an incoming communication via the communication interface,
determine whether the incoming communication is associated with a personal use of the mobile device or a business use of the mobile device,
automatically configure the mobile device in the personal mode in response to determining that the incoming communication is associated with the personal use, and
automatically configure the mobile device in the business mode in response to determining that the incoming communication is associated with the business use.

12. The mobile device of claim 11, wherein when configuring the mobile device in the personal mode, the logic is configured to:
block access to business related information or programs stored in the mobile device.

13. The mobile device of claim 11, wherein when determining whether the incoming communication is associated with a personal use of the mobile device or a business use of the mobile device, the logic is further configured to:
determine whether the communication was directed to a business line or a business telephone number, and
identify the incoming communication as being associated with the business use in response to determining that the communication was directed to the business line or business telephone number.

14. The mobile device of claim 11, wherein when determining whether the incoming communication is associated with a personal use of the mobile device or a business use of the mobile device, the logic is configured to:
access at least one contacts list stored in the mobile device,
determine whether the communication is associated with a contact identified in the at least one contacts list as a business contact or a personal contact, and
identify the incoming communication as being associated with the business use in response to determining that the telephone number is associated with a contact identified as only a business contact.

15. The mobile device of claim 11, wherein the logic is further configured to:
receive event information associated with a calendar application stored in the mobile device,
identify whether the event information corresponds to a personal event or a business event,
configure the mobile device in the personal mode in response to identifying that the event information corresponds to the personal event, and
configure the mobile device in the business mode in response to identifying that the event information corresponds to the business event.

16. The mobile device of claim 11, wherein the logic is further configured to:
initiate the transmission of a communication via the communication interface,
identify whether the communication is associated with a personal use of the mobile device or a business use of the mobile device,
configure the mobile device in the personal mode in response to identifying that the communication corresponds to the personal use, and
configure the mobile device in the business mode in response to identifying that the communication corresponds to the business use.

17. The mobile device of claim 11, wherein the mobile device comprises a cellular telephone, a tablet computer, or a personal digital assistant (PDA).

18. The mobile device of claim 11, wherein the user preference information identifies, for both the personal mode and the business mode, the background associated with the home screen of the mobile device, icons provided on the home screen of the mobile device, and links to information accessible via the home screen of the mobile device.

19. A non-transitory computer-readable medium having stored thereon sequences of instructions which, when executed by at least one processor in a device, cause the at least one processor to:
identify at least one of a time of day, a day of the week, a date or a location of the device;
access a database storing first information correlating the time of day, the day of the week, the date and the location to a personal mode for the device or a business mode for the device;
identify, in the database, exception information associated with at least one of the time of day, the day of the week, the date, or the location of the device;
identify user preference information associated with the personal mode of the device and the business mode of the device, wherein the user preference information identifies, for both the personal mode and the business mode, at least one of a background associated with a home screen of the device, icons provided on the home screen of the device, or links to information accessible via the home screen of the device;

provide a graphical user interface (GUI) configured to:
  receive, from a user, information correlating the time of day, the day of the week, the date and the location to either the business mode or the personal mode, and
  receive, from the user, the user preference information; and
configure the device in the personal mode or the business mode based on the first information and the exception information, wherein when configuring the device, the instructions further cause the at least one processor to:
  provide, on the home screen of the device, information corresponding to the user preference information associated with either the personal mode or the business mode.

20. The non-transitory computer-readable medium of claim 19, further including instructions for causing the at least one processor to:
  receive first communications via a communication interface;
  forward second communications for transmission via the communication interface; and
  dynamically configure the device in the personal mode or the business mode based on a type associated with each of the first and second communications.

21. The non-transitory computer-readable medium of claim 19, further including instructions for causing the at least one processor to:
  automatically configure the device in the personal mode or the business mode based on context-related information associated with operation of the device.

22. The non-transitory computer-readable medium of claim 18, wherein the user preference information identifies, for both the personal mode and the business mode, the background associated with the home screen of the device, icons provided on the home screen of the device, and links to information accessible via the home screen of the device.

* * * * *